United States Patent
Williams et al.

[19]

[11] Patent Number: 6,166,349
[45] Date of Patent: Dec. 26, 2000

[54] HYDRAULICALLY DRIVEN WELDING MACHINE WITH FEEDBACK

[75] Inventors: Robert G. Williams, Appleton, Wis.; Chad L. Crowley, Waconia, Minn.

[73] Assignee: Illinois Tool Works Inc., Glenview, Ill.

[21] Appl. No.: 09/412,423

[22] Filed: Oct. 5, 1999

[51] Int. Cl.$^7$ ...................................................... B23K 9/10
[52] U.S. Cl. ............................................ 219/133; 322/38
[58] Field of Search .......................... 219/133; 180/53.1, 180/53.4, 53.62, 53.8; 290/43, 54; 322/1, 38

[56] References Cited

U.S. PATENT DOCUMENTS

| | | | |
|---|---|---|---|
| 2,600,643 | 6/1952 | Hagelgantz | 322/1 |
| 2,898,542 | 8/1959 | Wasko et al. | 322/1 |
| 3,042,808 | 7/1962 | Jackson | 322/1 |
| 5,563,451 | 10/1996 | Furukawa | 180/53.8 |
| 5,968,385 | 10/1999 | Beeson et al. | 219/133 |

OTHER PUBLICATIONS

Gensco "Welding Units" Advertisement–undated.
Getec "AC Generators and Welders", Advertisement–undated.
Gensco "Dynaset Hydraulic Accessories", —Advertisement–undated.
Stanley "Hydraulic–Powered Alternators", Advertisement–undated.
Fabco "Power–Mite 110 Generator", Advertisement–undated.
Getec "Neckar II Utility Generator Set with Hydraulic Pump Drive", Advertisement–Undated.
Fabco "Hydraulic Driven A.C. Generator Hydro–10K" Advertisement, 1995.

*Primary Examiner*—Clifford C. Shaw
*Attorney, Agent, or Firm*—Mark W. Croll; John P. O'Brien; Donald J. Breh

[57] ABSTRACT

A hydraulically driven welding machine employs a closed loop control system for maintaining a constant speed of a generator. A feedback device produces a controlled frequency proportional to the actual generator frequency. The controlled frequency is compared with a reference frequency preset in the machine. Any error between the controlled and referenced frequencies is used to control a proportional flow control valve to regulate the flow of hydraulic fluid through a hydraulic motor that rotates the generator to maintain a constant generator speed under varying welding conditions. The source of the hydraulic fluid may be a hydraulic system of a motor vehicle. In an alternate embodiment, an adjustable orifice produces a pressure drop in the hydraulic system. A change in generator speed changes the pressure drop. The pressure drop is used to control a valve that diverts the proper amount of fluid flow to the hydraulic motor to maintain a constant pressure drop and thus a constant generator speed.

25 Claims, 3 Drawing Sheets

HYDRAULICALLY DRIVEN WELDING MACHINE WITH FEEDBACK

BACKGROUND OF THE INVENTION

1. Field of the Invention

This invention pertains to arc welding, and more particularly to apparatus for controlling the voltage at a welding arc.

2. Description of the Prior Art

Many welding jobs are located at a distance from a central source of electric power. To perform those jobs, self-contained welding machines have been developed. For example, welding machines that include an internal combustion engine and a generator are well known and are in widespread use.

Engine-driven welding machines are often transported to a welding site by a motor vehicle, such as a truck. Many trucks large enough to transport an engine-driven welding machine have built-in hydraulic systems, including a hydraulic pump, for operating such accessories as lifts, cranes, and baskets. For convenience, the welding machine normally remains on the truck during welding operations. Thus, two internal combustion engines are present at the job site: the engine in the truck, and the one in the welding machine. Obviously, the truck hydraulic system is also present at the job site.

To improve the economics associated with truck transported welding machines, it is known to use a hydraulic motor to drive a generator to produce electrical energy. At the job site, the welding machine hydraulic circuit is connected to the truck hydraulic pump. The truck engine, acting through the truck hydraulic pump and the welding machine hydraulic motor, thus becomes the prime mover for the welding machine generator.

Prior hydraulic driven welding machines have not proven entirely successful. The major problem was that the truck engine could not drive the truck hydraulic pump, and ultimately the welding machine generator, at a constant speed such that the generator produced a constant electrical output. The problem was especially severe at the start of a welding operation when the arc was struck. The initial surge of current loaded the generator and slowed it down to the point where the arc could not be maintained. For example, it was not uncommon for a generator that was rotating at 3600 revolutions per minute at no load to slow to as little as 2500 revolutions per minute at the start of high weld output level. That speed was too low to maintain a proper welding voltage. Even if the welding machine operator was successful in striking and maintaining an arc, the generator speed tended to pulsate causing the current to vary during welding. The corresponding variation in the welding voltage made it very difficult to produce a quality weld. Conversely, at the end of a heavy welding operation, the generator speed would increase dramatically, to as much as 4000 or even 4500 revolutions per minute when the arc was extinguished.

In an attempt to solve the generator speed problem, a person initially set the prime mover speed, i.e., the truck engine speed, via a manual or automatic throttle control. However, as the system heated, the fluid viscosity changed, possibly changing the generator/welder speed. When that occurred, the person was required to return to the vehicle to reset the prime mover speed.

Another proposed solution to the generator regulation problem was to add a governor to the truck engine. Although the governor was an improvement over manual engine speed adjusting, it nevertheless was not completely satisfactory. One reason was that even with a relatively constant engine speed, the flow of the hydraulic fluid from the truck pump to the welding machine motor could vary due to viscosity changes. At start up, for example, the hydraulic fluid was cool. As the system warmed during use, the fluid viscosity decreased and therefore tended to change the hydraulic motor speed despite the constant engine speed.

A further potential problem in prior hydraulic welding machines concerned the hydraulic pumps. The pumps frequently had performance characteristics that changed with changing system operating conditions. The pump therefore introduced another variable into the hydraulic welding machine.

Thus, a need exists for increased performance of the hydraulic systems of hydraulic welding machines.

SUMMARY OF THE INVENTION

In accordance with the present invention, a hydraulically driven welding machine is provided that maintains a more constant frequency of the electric welding energy than was previously possible. This is accomplished by apparatus that monitors a selected welding machine operating parameter and changes the speed of a welding machine generator in response to changes in the monitored parameter.

The generator and electrical welding power components of the welding machine are conventional. The generator shaft is connected to a hydraulic motor. The hydraulic motor is part of the welding machine hydraulic system, which is connected to the hydraulic pump of a conventional motor vehicle, such as a truck. Running the truck engine operates the pump to supply hydraulic fluid under pressure to the welding machine hydraulic system.

According to one aspect of the invention, a proportional flow control valve is interposed in the hydraulic line between the truck pump and the welding machine hydraulic motor. The proportional flow control valve is controlled by a signal that is a function of the difference between a preset generator frequency and the instantaneous generator frequency.

Generator frequency can be conveniently measured by measuring the speed of the generator rotor. Any of several types of devices can be used to convert generator speed to a voltage. For example, magnetic pulses of the generator rotor as it rotates can be sensed. Other alternatives include measuring the generator voltage wave form, digital tachometers, and optical sensors and counters.

The voltage representative of generator speed is fed back in a closed loop for comparison with the preset generator frequency. A decrease in generator speed below the desired speed produces a signal that controls the proportional flow control valve to open and allow more fluid to enter the motor and thereby increase the generator speed. Conversely, an increase in generator speed above the desired speed produces a signal that decreases the fluid flow to the motor and thereby brings the generator speed back to the desired speed. The closed loop system functions very well to maintain a constant generator speed and thus supply a stable voltage to a welding arc under all conditions from start to completion of a welding operation.

According to another aspect of the invention, constant electric welding energy frequency is maintained by regulating the pressure drop of the hydraulic fluid across an orifice. From the orifice, the fluid flows to a hydraulic motor. The pressure drop is originally determined under steady state welding machine operating conditions at the desired generator speed. The pressure drop, and thus the flow to the hydraulic motor, is regulated by a diverter valve. If the generator speed decreases, such as when an arc is struck, the slowing of the hydraulic motor causes the pressure drop to decrease. The diverter valve senses the reduced pressure drop and increases flow to the orifice and the hydraulic motor. The hydraulic motor and generator therefore increase in speed. The flow increases until the original pressure drop across the orifice has been restored. From that point, the diverter valve maintains the proper flow until the next change in pressure drop occurs.

Other advantages, benefits, and features of the present invention will become apparent to those skilled in the art upon reading the detailed description of the invention.

BRIEF DESCRIPTION OF THE DRAWINGS

FIG. 3 is a control block diagram of the invention of FIG. 2.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
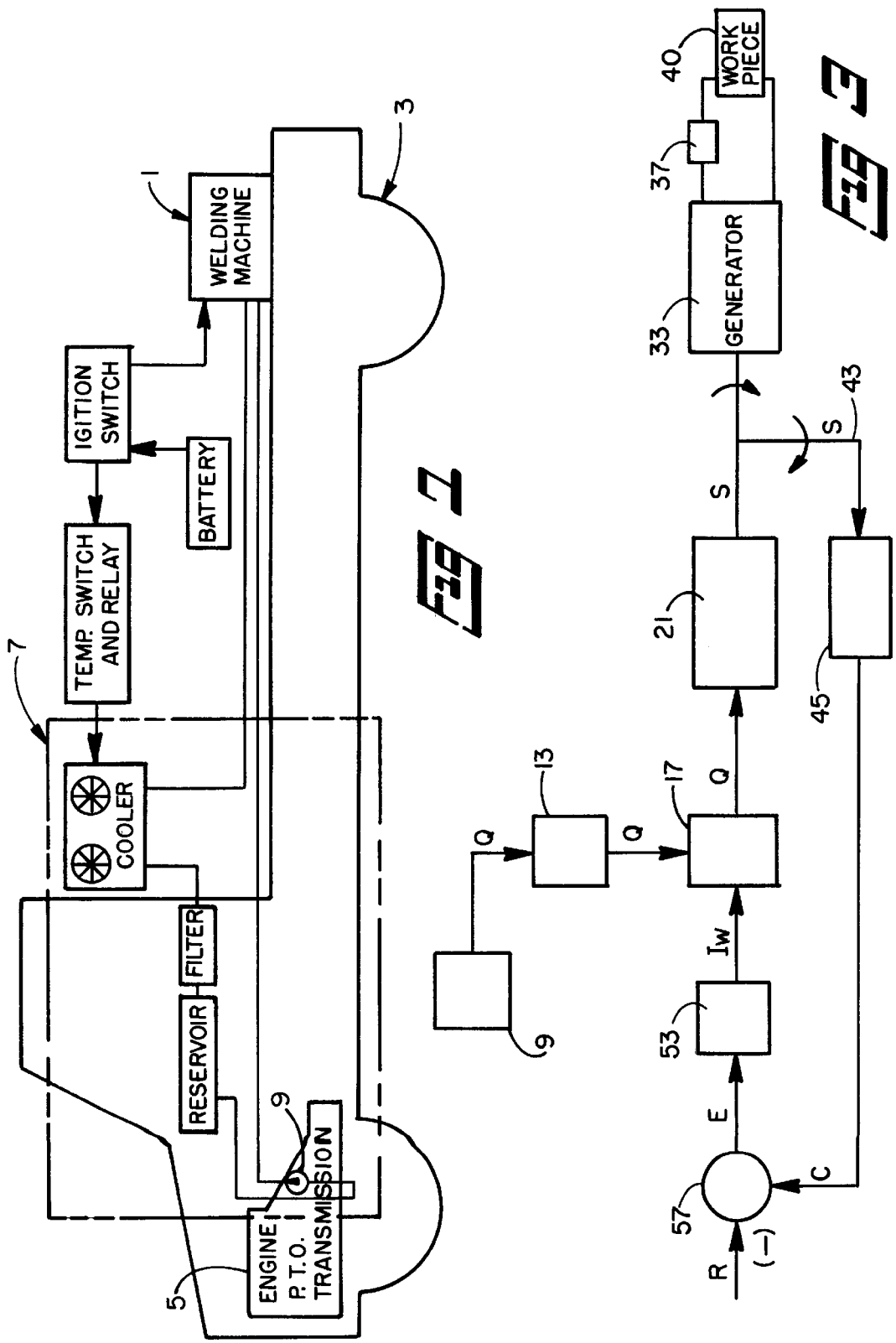
FIG. 1 is a mechanical schematic diagram of a typical installation of a hydraulically driven welding machine of the present invention.

Referring first to FIG. 1, a hydraulically driven welding machine 1 is shown schematically mounted to a conventional motor truck 3. The truck 3 includes an internal combustion engine with transmission 5 as well as a hydraulic system schematically represented at reference numeral 7. A power takeoff of the truck transmission 5 drives a hydraulic gear pump 9 of the hydraulic system 7. The hydraulic system 7 may be used for operating hoists, dumps, or similar accessories built into the truck. The truck, as well as its engine, transmission, and hydraulic system form no part of the present invention.

In the described application of the hydraulically driven welding machine 1, the pump 9 of the truck 3 is also used to provide hydraulic power for the welding machine. However, it will be understood that the invention is not limited to being powered by a motor vehicle.

Figure 2:
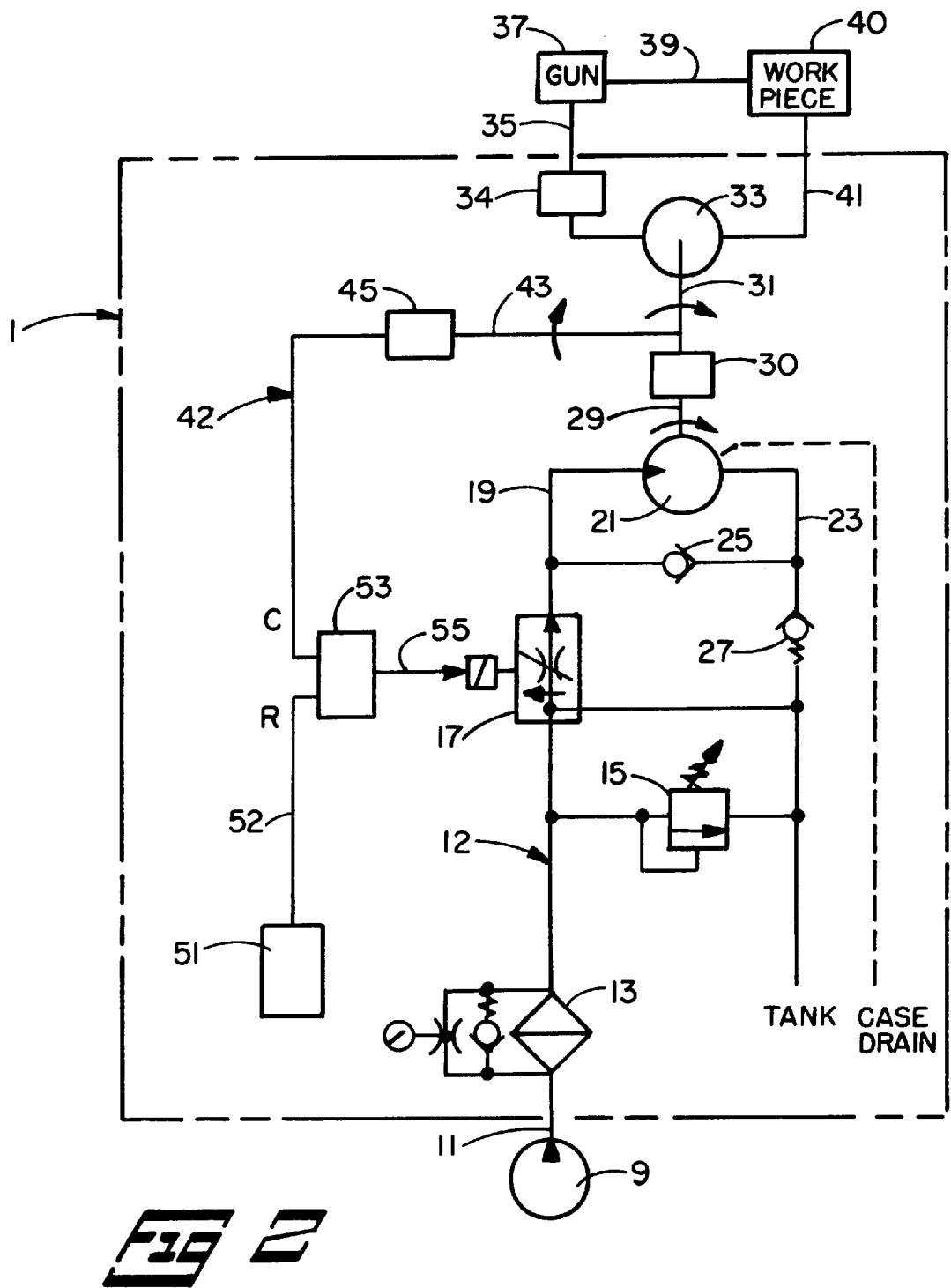
FIG. 2 is a physical schematic diagram of an embodiment of the invention that uses closed loop feedback to control generator speed.

Looking also at FIG. 2, hydraulic fluid from the truck pump 9 is directed by a pressure line 11 to a hydraulic system 12 of the welding machine 1. The welding machine hydraulic system 12 includes a filter 13, downstream of which is a pressure relief valve 15. The pressure relief valve 15 is set at the operating pressure for the welding machine. Also downstream of the filter 13 is a proportional flow control valve 17. A line 19 connects the proportional flow control valve 17 to a fixed displacement hydraulic motor 21. A return line 23 connects the motor 21 to the tank of the truck hydraulic system 7. Check valves 25 and 27 protect the welding machine hydraulic system against reverse pressure surges.

The shaft 29 of the hydraulic motor 21 is mechanically connected by a coupling 30 to the shaft 31 of a generator 33. Reference numeral 35 represents an electrical connection from the generator 33 through welding power components 34 to a welding electrode holder 37. Reference numeral 39 represents a welding stick or wire that is in contact with a workpiece 40 that is to be welded. The workpiece 40 is connected through a ground or directly back to the generator, as is indicated by reference numeral 41.

The present invention is concerned with maintaining a voltage sufficiently constant to maintain an electrical welding arc at the electrode holder 37 regardless of the welding conditions between the electrode 39 and the workpiece 40. Accordingly, it is necessary that the rotor of the generator 33 rotate at a constant speed under all welding conditions. To maintain the constant generator speed, the hydraulically driven welding machine 1 includes a closed loop control system 42 that is independent of the truck engine 5. Specifically, a feedback loop 43 is incorporated into the welding machine. The feedback loop 43 comprises a feedback device 45 that converts generator rotor speed or other variable based on rotor speed into an electrical signal. The feedback device 45 may be any of several kinds, as, for example, a digital tachometer. Other suitable feedback devices include magnetic pickups, instruments that measure the generator voltage wave form, and optical sensors. It is contemplated that sampling the rotor speed once each revolution, or approximately every 16.5 milliseconds, will give satisfactory results. The electrical signal produced by the feedback device 45, which may be in pulses, is fed to a comparator 53 as the controlled variable C of the welding machine control system 42. The comparator 53 is connected by a wire 55 to the torque motor of the proportional flow control valve 17.

A reference frequency R of the control system 42 is preset, as by software or a computer chip represented at reference numeral 51. The preset frequency R may be set to suit auxiliary equipment of the welding machine. The preset frequency is fed by a lead 52 to the comparator 53.

The reference frequency R is compared to the instantaneous frequency C from the feedback loop 43. Any difference between the reference and controlled frequencies results in a current that controls the proportional flow control valve torque motor to regulate the fluid flow through the valve.

FIG. 3 shows the block diagram for the control system 42 of the hydraulically driven welding machine 1. The reference frequency R is fed to a summing junction 57. For clarity in the block diagram of FIG. 3, the summing junction 57 is shown separately from the block for the comparator 53. The controlled frequency C is also fed to the summing junction 57. Any difference between the reference frequency R and the controlled frequency C results in an error E. The error E produces an output current Iw from the comparator 53 to vary the flow Q through the proportional flow control valve 17 and thereby vary the motor and generator speed such that the error E tends to reduce to zero. The control system thus functions to produce a constant generator speed.

In operation, at welding start-up there is a heavy current draw from the generator 33 that tends to slow the generator and the motor 21. The drop in generator speed is sensed by the feedback device 45. When the proportionally decreased controlled frequency C is fed to the summing junction 57, the resulting error E relative to the reference frequency R causes the proportional flow control valve 17 to increase hydraulic fluid flow to the motor. Conversely, stopping a heavy welding operation causes the motor to speed up. The resulting increased frequency C at the summing junction produces an error E that controls the proportional flow control valve to decrease the amount of fluid to the motor.

Figure 4:
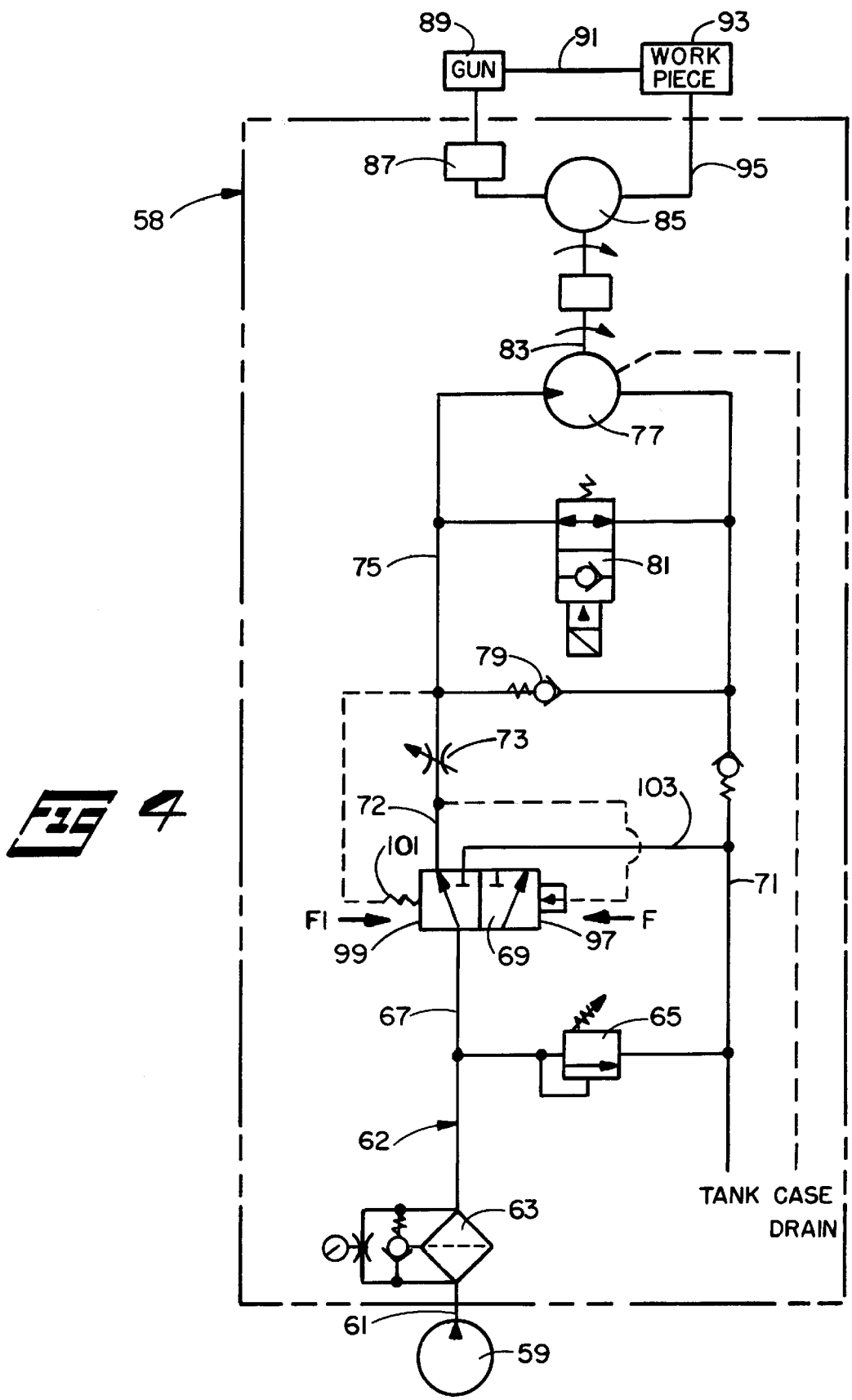
FIG. 4 is a schematic diagram of an embodiment of the invention that monitors the hydraulic system to control generator speed.

FIG. 4 shows an alternate hydraulically driven welding machine 58 according to the present invention. A fixed displacement hydraulic pump 59 supplies hydraulic fluid through a line 61 to a hydraulic system 62. The hydraulic system 62 includes a filter 63 and a pressure relief valve 65. The pressure relief valve 65 is set at the desired operating pressure for the hydraulic system. From the pressure relief valve, a line 67 connects to the inlet port of a spring-loaded diverter valve 69. One outlet port of the diverter valve 69 connects to the system return line 71 via an exhaust line 103. Another outlet port of the diverter valve connects by a line 72 to the upstream side of an orifice, which may be an adjustable needle valve 73. A line 75 directs hydraulic fluid from the adjustable needle valve 73 to a hydraulic motor 77. There is a check valve 79 between the line 75 and the return line 71. There also is a safety valve 81 between the lines 75 and 71. The hydraulic motor shaft 83 connects to the armature of a generator 85. The generator 85 supplies electrical welding power through suitable welding components 87 to an electrode holder 89 and a welding stick or wire 91 that contacts the workpiece 93 to be welded. The workpiece 93 is grounded to the generator by a cable 95.

The hydraulic system 62 functions to maintain a constant speed of the hydraulic motor 77 and thus of the generator 85. That is achieved by monitoring and regulating the pressure drop across the adjustable needle valve 73. The pressure drop is initially determined by system operating requirements, such as the size, speed, and power output of the hydraulic motor. Since the line 72 is connected directly to the pump 59 and pressure relief valve 65, the pressure at the inlet of the adjustable needle valve is constant. The constant pressure is fed to one side 97 of the spool of the diverter valve 69 to produce a force F on the spool. The pressure in the line 75 varies with changing conditions at the hydraulic motor, thereby causing changes in the pressure drop across the adjustable needle valve. The pressure in the line 75 is fed to the second side 99 of the diverter valve. A spring 101 supplies a constant force additional to that produced by the pressure in the line 75 to result in a total force Fl that is generally equal to the force F produced by the pressure in the line 72.

When operating under steady state conditions, the diverter valve 69 dithers to allow the proper amount of hydraulic fluid to flow to the adjustable needle valve 73 and the hydraulic motor 77. Excess fluid passes through the exhaust line 103 to the return line 71.

At welding startup, the generator 85 and hydraulic motor 77 slow in speed. There is a resulting decrease in the pressure drop across the adjustable needle valve 73, which increases the pressure in the line 75. The increased pressure in the line 75 causes the diverter valve spool to shift slightly against the force F of the spool. That action diverts some of the fluid flow from the exhaust line 103 to the line 72, and thus to the adjustable needle valve 73. The increased flow through the adjustable needle valve increases the pressure drop across it, and also increases the flow to the motor, which increases the motor speed. The flow in the line 72 increases until the original pressure drop across the adjustable needle valve is restored. At that point, the motor and generator speed, and thus the generator frequency, are again at the desired level. Returning the pressure drop across the adjustable needle valve to its initial value reduces the force Fl on the diverter valve spool. As a result, some of the fluid flow is diverted from the line 72 back to the exhaust line 103 and to the return line 71 to maintain the original pressure drop. The hydraulic system 62 is then again at the steady state condition, with the generator producing welding power at the proper frequency.

If, during the course of operating the welding machine 58, an overspeed condition occurs, the machine is automatically shut down. For that purpose, a sensor based on generator speed, not shown, such as a digital tachometer or magnetic pickup, constantly measures the generator speed. If the generator speed reaches a predetermined level, a signal from the sensor actuates the safety valve 81 to open and dump all the hydraulic fluid over it from the line 75 to the return line 71.

Thus, it is apparent that there has been provided, in accordance with the invention, a hydraulically driven welding machine with feedback that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A hydraulically powered welding machine comprising an electrical system that produces electrical energy for one or more welding processes; and a hydraulic system that drives the electrical system and that responds to a change in a selected parameter of a selected one of the electrical system or the hydraulic system such that the hydraulic system response affects the electrical energy produced for a selected welding process.

2. The hydraulically powered welding machine of claim 1 wherein the hydraulic system responds to a feedback signal that is indicative of a selected parameter of the electrical system.

3. The hydraulically powered welding machine of claim 2 wherein:

a. the electrical system comprises a generator;

b. the selected parameter is a controlled frequency of the electrical system, and the feedback signal is indicative of the controlled frequency;

c. the hydraulic system comprises a hydraulic motor that rotates the generator to produce the electrical energy at the controlled frequency; and d. the hydraulic motor responds to the feedback signal to affect the controlled frequency.

4. The hydraulically powered welding machine of claim 3 wherein the hydraulic system further comprises a proportional flow control valve that responds to the feedback signal to regulate the hydraulic motor to maintain the electrical energy at the controlled frequency.

5. The hydraulically driven welding machine of claim 3 wherein:

a. the electrical system further comprises a source of a reference frequency; and b. the hydraulic system further comprises a proportional flow control valve that responds to a difference between controlled frequency and the reference frequency to regulate the hydraulic motor to maintain the electrical energy at the controlled frequency.

6. The hydraulically powered welding machine of claim 1 wherein:
   a. the electrical system comprises a generator;
   b. the selected parameter is a pressure drop in the hydraulic system;
   c. the hydraulic system comprises a hydraulic motor that rotates the generator to produce the electrical energy at a controlled frequency; and
   d. the hydraulic motor responds to a change in the pressure drop to affect the controlled frequency.

7. The hydraulically powered welding machine of claim 6 wherein:
   a. the hydraulic system further comprises:
      i. a pump that supplies hydraulic fluid to the hydraulic motor; and
      ii. an orifice interposed between the pump and the motor that produces the pressure drop, the orifice producing a first pressure drop when the pump supplies hydraulic fluid to the orifice and the motor such that the generator produces electrical energy at a first frequency, the orifice producing a second pressure drop when the pump supplies hydraulic fluid to the orifice and motor such that the generator produces electrical energy at a second frequency; and
   b. the hydraulic system responds to the second pressure drop to change the supply of hydraulic fluid to the orifice and the motor to return the second pressure drop to the first pressure drop and thereby supply the hydraulic motor with hydraulic fluid such that the generator produces electrical energy at the first frequency.

8. The hydraulically powered welding machine of claim 7 further comprising a diverter valve interposed between the pump and the orifice, the diverter valve responding to a change in the pressure drop across the orifice from the first pressure drop to the second pressure drop to regulate the hydraulic flow through the orifice and the motor to maintain the first pressure drop and thereby maintain the electrical energy at the first frequency.

9. The hydraulically powered welding machine of claim 7 wherein the orifice is adjustable.

10. The hydraulically powered welding machine of claim 7 further comprising safety means for directing hydraulic fluid completely away from the hydraulic motor and thereby stopping the hydraulic motor in response to the generator attaining a predetermined overspeed condition.

11. A hydraulically driven welding machine comprising:
   a. a hydraulic motor that drives a generator to produce a predetermined generator output for performing a selected welding operation; and
   b. a closed loop control system that senses an actual generator output and utilizes differences thereof from the predetermined generator output to regulate hydraulic fluid flowing from a source thereof through the hydraulic motor to maintain the predetermined generator output.

12. The hydraulically driven welding machine of claim 11 wherein:
   a. the predetermined generator output is a predetermined generator speed; and
   b. the closed loop control system senses an actual generator speed to regulate the hydraulic fluid flowing through the hydraulic motor to maintain the predetermined generator speed.

13. The hydraulically driven welding machine of claim 11 wherein the closed loop control system comprises a proportional flow control valve that regulates the amount of hydraulic fluid flowing through the hydraulic motor to maintain the predetermined generator output.

14. The hydraulically driven welding machine of claim 12 wherein the closed loop control system comprises:
   a. feedback means for producing a controlled signal corresponding to the actual generator speed; and
   b. valve means for receiving the controlled signal from the feedback means and for regulating the amount of hydraulic fluid flowing through the hydraulic motor in response to a difference between the controlled signal and a selected reference signal.

15. The hydraulically driven welding machine of claim 14 wherein the valve means comprises a proportional flow control valve interposed between the source of the hydraulic fluid and the hydraulic motor.

16. The hydraulically driven welding machine of claim 14 wherein:
   a. the selected reference signal is a preset reference frequency;
   b. the controlled signal from the feedback means is a controlled frequency proportional to the actual generator speed; and
   c. the difference between the reference frequency and the controlled frequency produces an error that controls the valve means to regulate the amount of hydraulic fluid flowing through the hydraulic motor.

17. Apparatus for performing welding operations comprising:
   a. means for presetting a predetermined frequency for a welding operation;
   b. generator means for generating welding power at the predetermined frequency;
   c. motor means for rotating the generator means at a speed that generates the welding power at the predetermined frequency;
   d. electrode means for utilizing the welding power to perform the welding operation at the predetermined frequency;
   e. pump means for supplying hydraulic fluid to the motor means;
   f. valve means for regulating the fluid flowing from the pump means to the motor means; and
   g. feedback means for controlling the valve means to regulate the fluid flowing to the motor means to maintain the predetermined generator frequency regardless of changes in the welding operation.

18. The apparatus of claim 17 wherein:
   a. the pump means comprises:
      i. a hydraulic pump; and
      ii. a motor vehicle having engine and transmission means for driving the hydraulic pump; and
   b. the feedback means operates independently of the motor vehicle engine and transmission means.

19. The apparatus of claim 17 wherein the valve means comprises a proportional flow control valve.

20. The apparatus of claim 17 wherein:
   a. a reference frequency is fed to a summing junction;
   b. the feedback means comprises means for converting the generator speed to a controlled frequency that is fed to the summing junction; and c. a difference between the reference frequency and the controlled frequency at the summing junction produces an error that controls the valve means to regulate the fluid flowing to the motor means to maintain a generator speed that generates the welding power at the predetermined frequency.

21. A method of controlling a hydraulically driven welding machine comprising the steps of:
   a. providing a hydraulic system and an electrical system including a generator;
   b. predetermining a value of a selected parameter of a selected one of the hydraulic system and the electrical system;
   c. operating the hydraulic system to rotate the generator at a first speed that produces first electrical welding energy while the selected parameter is at the predetermined value thereof;
   d. changing the first generator speed to a second speed and simultaneously changing the selected parameter from the predetermined value thereof; and
   e. using the change in the selected parameter from the predetermined value thereof to return the generator speed from the second speed to the first speed and simultaneously returning the selected parameter to the predetermined value thereof,
   so that the welding machine maintains producing the first electrical welding energy.

22. The method of claim 21 wherein:
   a. the step of predetermining a value of a selected parameter comprises the step of setting a predetermined reference frequency of the electrical welding energy suitable for a selected welding process;
   b. the step of operating the hydraulic system comprises the step of rotating the generator to produce the electrical welding energy at a controlled frequency;
   c. the step of changing the first generator speed comprises the step of changing the controlled frequency; and
   d. the step of using the change in the selected parameter comprises the steps of:
      i. comparing the controlled frequency with the reference frequency; and
      ii. changing the second generator speed in response to a difference between the controlled frequency and the reference frequency to return the generator speed to the first speed and thereby maintaining the controlled frequency of the electrical welding energy substantially equal to the reference frequency.

23. The method of claim 22 wherein:
   a. the step of operating the hydraulic system comprises the steps of:
      i. connecting the generator rotor to a hydraulic motor; and
      ii. flowing hydraulic fluid from a source thereof through the hydraulic motor and thereby rotating the motor and the generator rotor; and
   b. the step of changing the first generator speed comprises the steps of:
      i. interposing a proportional flow control valve between the source of the hydraulic fluid and the hydraulic motor; and
      ii. controlling the proportional flow control valve to regulate the flow of hydraulic fluid through the motor in response to the difference between the controlled frequency and the reference frequency.

24. The method of claim 21 wherein:
   a. the step of predetermining a value of a selected parameter comprises the step of setting a predetermined pressure drop within the hydraulic system;
   b. the step of operating the hydraulic system comprises the step of rotating the generator at the first generator speed and simultaneously producing the predetermined pressure drop;
   c. the step of changing the first generator speed comprises the step of changing the pressure drop from the predetermined value thereof to a second value; and
   d. the step of using the change in the selected parameter comprises the step of using the change in the pressure drop to return the pressure drop from the second value to the predetermined value thereof and simultaneously returning the generator speed to the first generator speed.

25. The method of claim 24 wherein:
   a. the step of providing a hydraulic system comprises the steps of providing a hydraulic motor that drives the generator, and an orifice that directs hydraulic fluid to the hydraulic motor;
   b. the step of setting a predetermined pressure drop comprises the step of setting a predetermined pressure drop across the orifice in response to the generator rotating at the first generator speed; and
   c. the step of using the change in the pressure drop comprises the step of changing hydraulic fluid flow to the orifice and the hydraulic motor in response to a change in the predetermined pressure drop across the orifice.

* * * * *